United States Patent
Tsuji et al.

(10) Patent No.: US 6,419,264 B1
(45) Date of Patent: Jul. 16, 2002

(54) AIR-BELT DEVICE AND METHOD

(75) Inventors: Tetsuo Tsuji; Hiroyuki Takeuchi, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/522,691

(22) Filed: Mar. 10, 2000

(51) Int. Cl.$^7$ .............................................. B60R 21/18
(52) U.S. Cl. ...................... 280/733; 280/736; 280/801.1
(58) Field of Search ................................ 280/733, 736, 280/801.1

(56) References Cited

U.S. PATENT DOCUMENTS

| | | | | |
|---|---|---|---|---|
| 3,791,670 A | * | 2/1974 | Lucore et al. ............... | 280/733 |
| 5,346,250 A | | 9/1994 | Kamiyama | |
| 5,385,367 A | * | 1/1995 | Tanaka et al. ............... | 280/733 |
| 5,445,411 A | * | 8/1995 | Kamiyama et al. .......... | 280/733 |
| 6,062,597 A | * | 5/2000 | Suyama ....................... | 280/733 |
| 6,170,863 B1 | * | 1/2001 | Takeuchi et al. ............ | 280/733 |

FOREIGN PATENT DOCUMENTS

JP          5-85301           9/1991

* cited by examiner

*Primary Examiner*—J. J. Swann
*Assistant Examiner*—J. Allen Shriver
(74) *Attorney, Agent, or Firm*—Foley & Lardner

(57) ABSTRACT

An inflatable air-belt device including a shoulder belt and lap belt. When the air-belt is inflated, a tension is generated in the shoulder belt and is transferred to the lap belt so that both the shoulder belt and the lap belt adhere closely to an occupant. When an emergency condition is detected, an inflator is actuated to inflate a bag located in the shoulder belt creating a tension of more than a predetermined strength in the shoulder belt. The lap belt is drawn toward the shoulder belt to release a stopper located in a buckle positioned between the belts. The lap belt moves toward the shoulder belt through a hole located in the tongue of the buckle. A nozzle for receiving pressurized gas is inserted in a slit in the belts so that the lap belt may move smoothly toward the shoulder belt without obstruction.

9 Claims, 4 Drawing Sheets

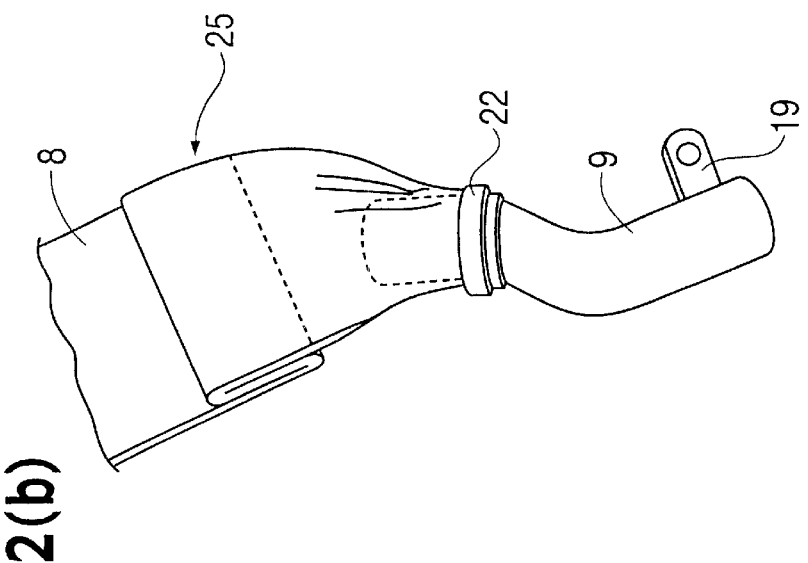
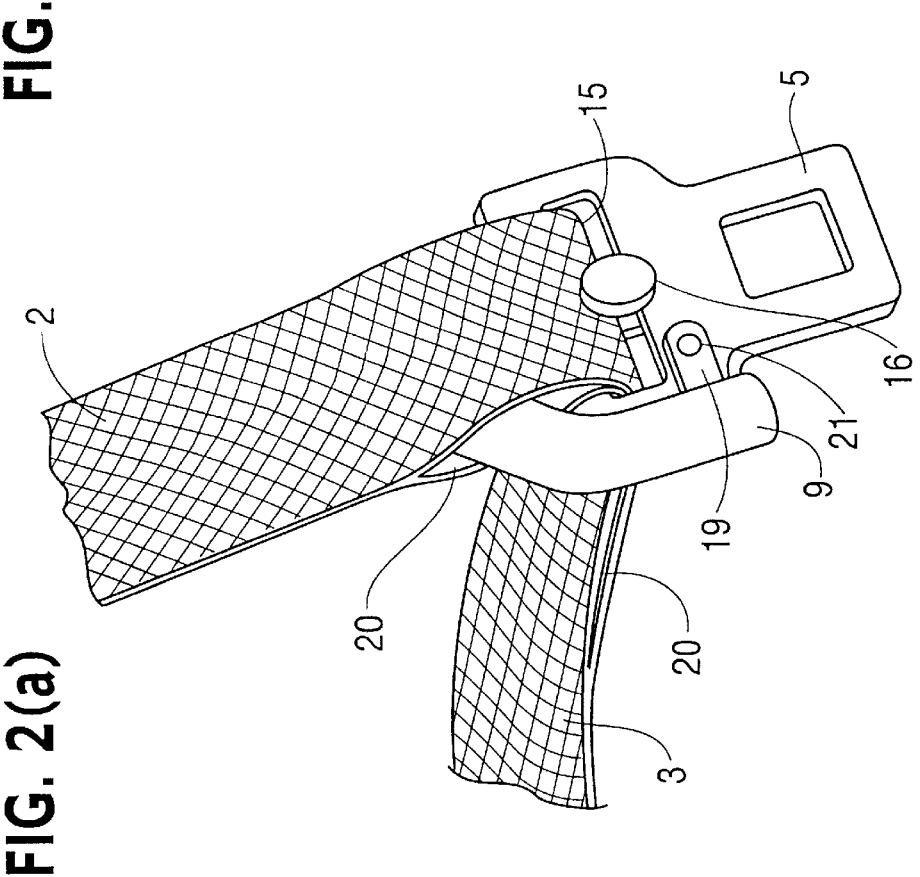
FIG. 2(a)
FIG. 2(b)

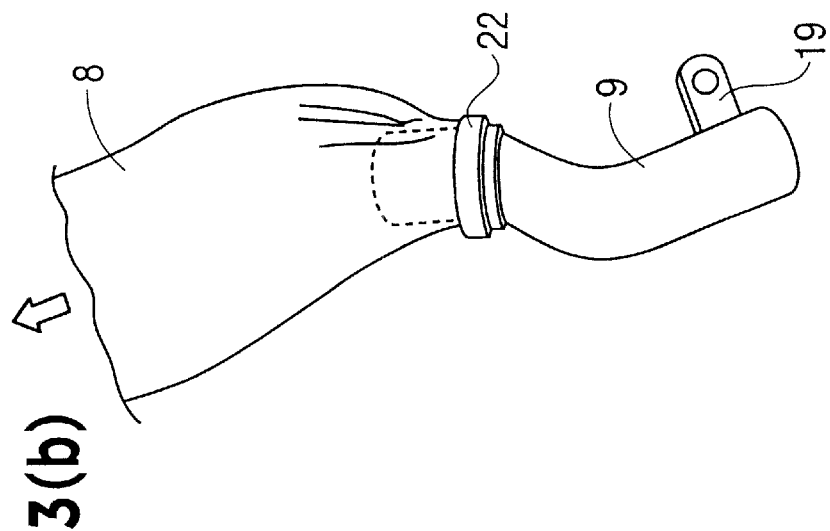
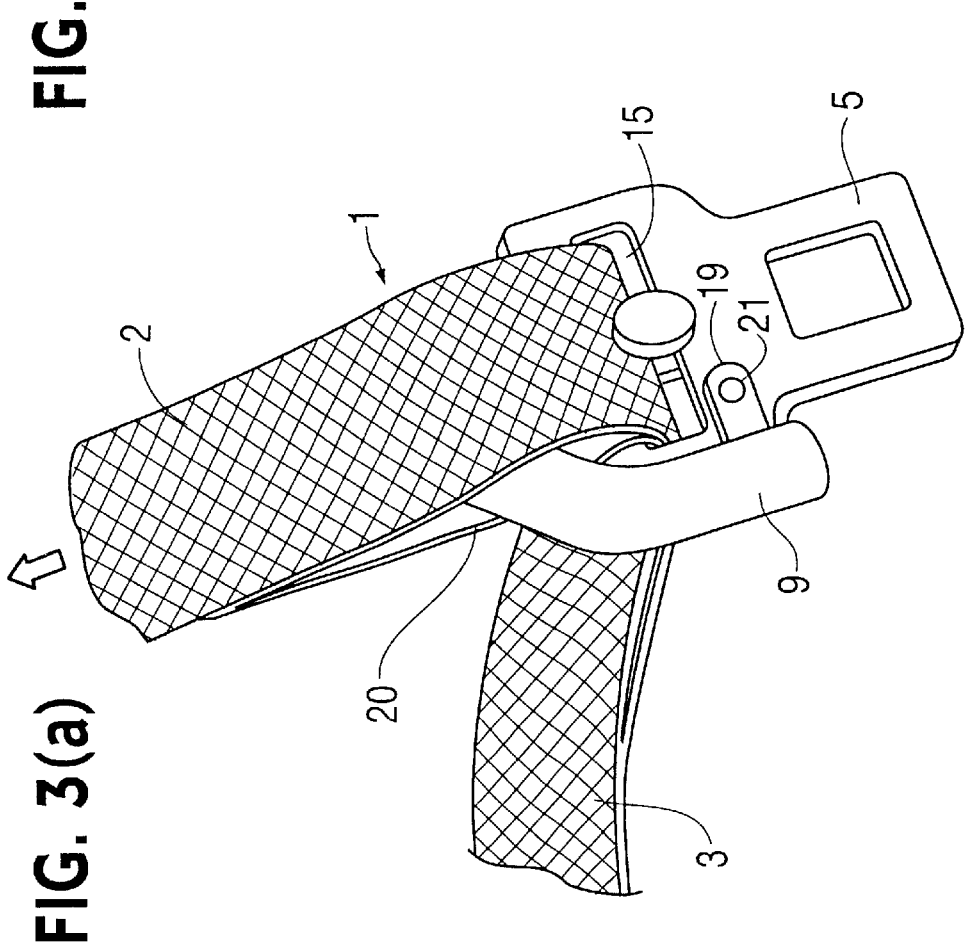

AIR-BELT DEVICE AND METHOD

BACKGROUND OF THE INVENTION

1. Field of the Invention

The present invention relates to devices for protecting occupants of a movable body such as a vehicle especially during a collision involving the vehicle. In particular, the present invention relates to a device for restraining an occupant in the manner of a seatbelt and having an air-belt inflated by gas provided by a gas generator.

2. Description of the Related Art

In an air-belt device, at least a portion, especially the portion touching an occupant's body, of the webbing of a seatbelt device is implemented as an inflatable air-belt. When a collision or other emergency situation requiring protection of the occupant occurs, a gas generator is activated to inflate the air-belt. Japanese Unexamined Patent Publication No. 5-85301 and U.S Pat. No. 5,346,250, both of which are incorporated by reference herein, disclose an example of an air-belt device in which one end of an air-belt is connected to a tongue, and paths for gas are respectively disposed in the tongue and a buckle in which the tongue may be fitted, so that gas may be introduced into the air-belt via the paths. The other end of the air-belt is connected to a length of webbing identical to a conventional seatbelt device by sutures, and the length of webbing is wound onto a seatbelt retractor. A lap belt is formed of webbing identical to a conventional seatbelt and is connected to the tongue. When the air-belt is inflated by introduction of gas into the air-belt the length of the shoulder is shortened, creating a tension in the shoulder belt.

SUMMARY OF THE INVENTION

It is an object of the present invention to provide an air-belt device in which a portion of the tension generated in the shoulder belt is transferred to the lap belt while sufficient tension is applied to both the shoulder belt and the lap belt in order to protect and restrain the occupant.

An air-belt device according to the present invention comprises: an air-belt having a bag into which gas is introduced and a length of mesh webbing covering the bag; a tongue having a hole which the mesh webbing of the air-belt passes through; a buckle in which the tongue is mounted; a shoulder-side retractor for rolling up a shoulder-side end portion of the mesh webbing; a lap-side retractor for rolling up a lap-side end portion of the mesh webbing; a passage disposed in the buckle for carrying gas; and a gas-receiving means disposed in the tongue and connected to the bag positioned to mate with the passage when the tongue is mounted in the buckle, wherein a slit is formed in a side edge of the mesh webbing in the region of the hole in the tongue, and wherein the gas-receiving means is disposed in the slit. It is preferable that the slit in the webbing extend toward both the shoulder-side and the lap-side of the mesh webbing from the hole in the tongue.

In the air-belt device, the shoulder belt is drawn around the front portion of the upper half of an occupant body by mounting the tongue in the buckle. When a vehicle encounters an emergency such as a collision, gas is injected from the passage in the buckle into the bag via the gas-receiving means so as to inflate the bag and generate tension in the shoulder belt. The lap belt is drawn toward the shoulder belt to generate tension in the lap belt as well. A slit is formed in the length of mesh webbing of the air-belt. Because the gas-receiving means is inserted in the slit, when a tension is generated in the shoulder belt to draw the lap belt, the lap belt moves smoothly toward the shoulder belt through the hole in the tongue without obstruction. The gas-receiving means may be formed of a pipe-shaped nozzle to be connected to the tongue. It is preferable that the bag be connected to the rear end of the pipe-shaped nozzle.

According to the present invention, an air-belt device may further comprise a retaining member or stopper for securing the mesh webbing of the air-belt to the tongue. The retaining member may be located adjacent the hole in the tongue and may be released by when a predetermined force of more is exerted on the mesh webbing of the air-belt thereby allowing the webbing to pass freely through the hole in the tongue.

According to the present invention, the internal surface of the mesh webbing and the bag may be bonded together. Preferably the bonding releases when the bag is inflated.

BRIEF DESCRIPTION OF THE DRAWINGS

FIG. 2(*a*) is a schematic representation of the connection between the air-belt and the tongue shown in FIG. 1.

FIG. 2(*b*) is a schematic representation of a gas receiving nozzle and an inflatable bag for the air belt device of FIG. 1.

FIG. 3(*a*) is a schematic representation showing the connection between the air-belt and the tongue shown in FIG. 2(*a*) in an inflated state.

FIG. 3(*b*) is a schematic representation of the gas receiving nozzle and the inflatable bag shown in FIG. 2(*a*) in an inflated state.

FIG. 4(*b*) is a perspective view of the stopper of FIG. 4(*a*) in a separated state.

DETAILED DESCRIPTION OF THE PREFERRED EMBODIMENT

Figure 1:
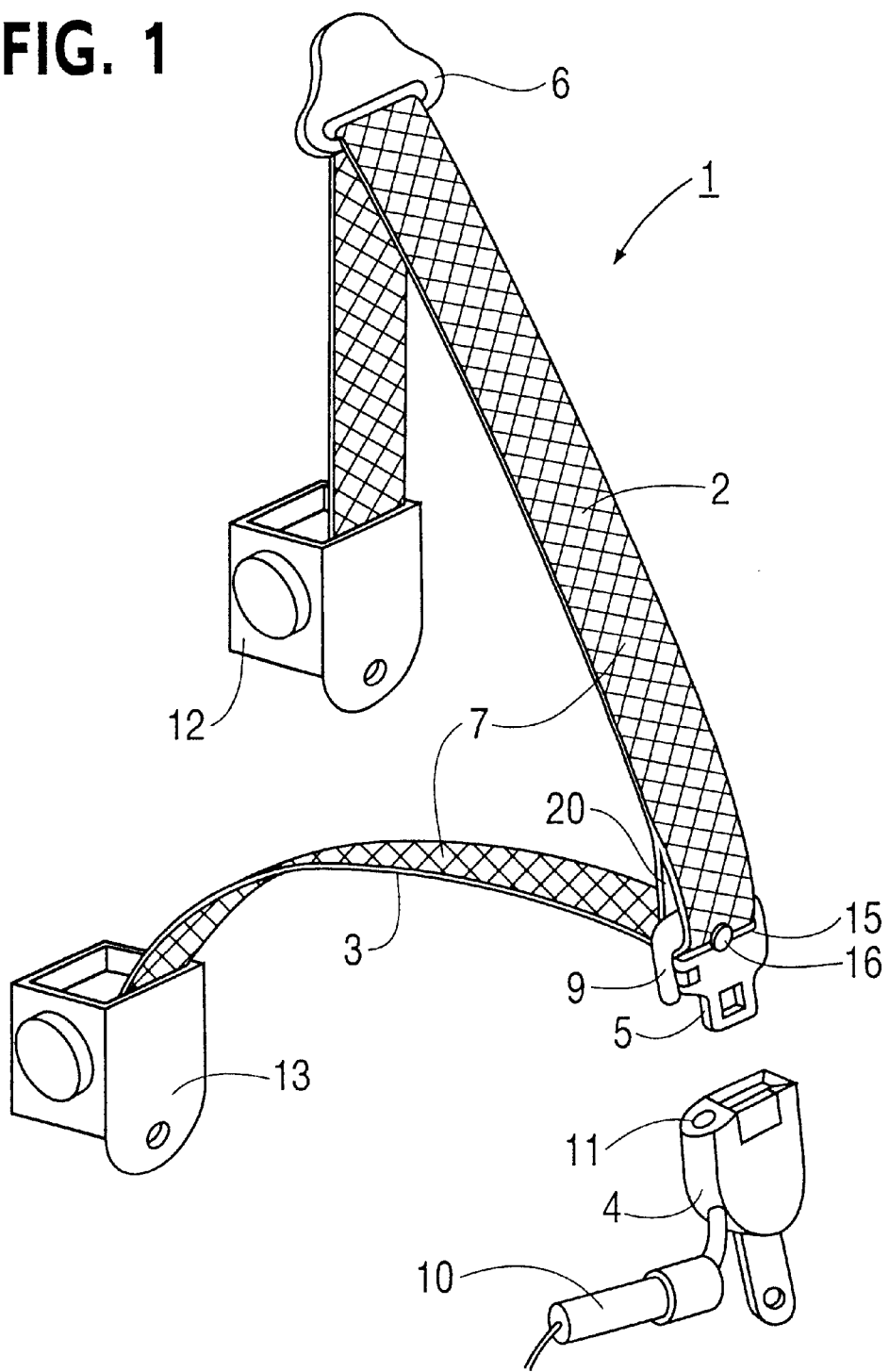
FIG. 1 is a perspective view showing an air-belt device according to an embodiment of the present invention.
Figure 4A:
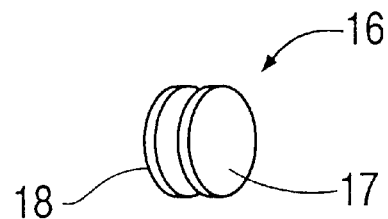
FIG. 4(*a*) is a perspective view of the stopper.
Figure 4B:
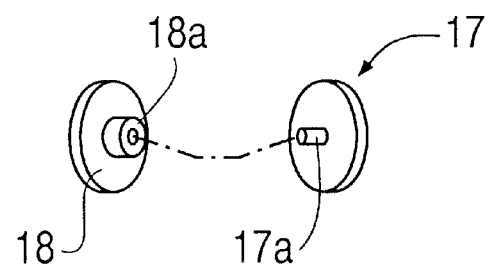
Figure 5:
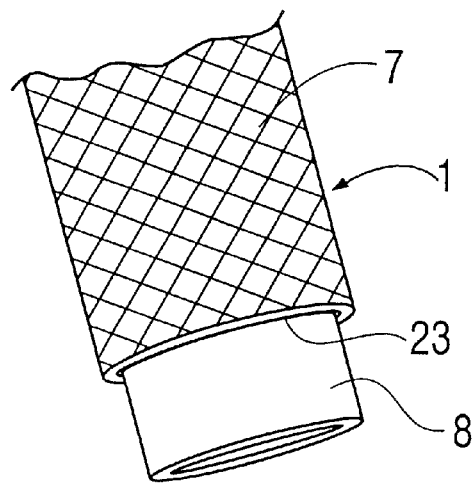
FIG. 5 is a partially cutaway schematic view showing the bonding layer connecting the inflatable bag to the mesh webbing of the air belt.

An embodiment of the present invention will be described below with reference to the drawings. FIG. 1 is a perspective view of an air-belt device according to the present invention; FIG. 2(*a*) is a plan view of the connecting portion between an air-belt and a tongue; FIG. 2(*b*) is a perspective view showing a bag and a nozzle in the connecting portion; FIGS. 3(*a*) and 3(*b*) are perspective views of the same portions as in FIGS. 2(*a*) and 2(*b*) in an inflated state; FIG. 4 includes perspective views of a retaining member; and FIG. 5 is a perspective view showing an internal structure of the air-belt.

As shown in FIG. 1, the air-belt 1 comprises mesh webbing 7 including a shoulder belt 2 and a lap belt 3, a buckle 4 disposed in a vehicle body (e.g. in the floor of the vehicle), a tongue 5 to be inserted and retained in the buckle 4 during belt mounting, and a shoulder anchor 6 for guiding the shoulder belt 2.

The shoulder belt 2 and the lap belt 3 are integrally formed from the mesh webbing 7. The shoulder belt 2 is preferably connected to a seat belt retractor 12 that includes an emergency locking mechanism. This type of retractor commonly is referred to as an "Emergency Locking Retractor" or ELR. The retractor may be fixed to the vehicle body. The shoulder belt 2 is wound or rolled up in the retractor 12 after being slidably inserted through the shoulder anchor 6. The shoulder belt 2 is drawn across the front surface of the upper half of an occupant's body. The lap belt 3 drawn around the front surface of the occupant's waist and is would or rolled up in an ELR type seat belt retractor 13 fixed to the vehicle body.

The air belt also may include a bag 8 disposed in the mesh webbing 7, and a nozzle 9 connected to the bag 8 and secured to the tongue 5. An inflator 10 is connected to the buckle 4 for generating high pressure gas when it is actuated by an emergency situation such as a vehicle collision. A sensing device (not shown) detects the occurrence of an emergency situation to activate the inflator 10. A cylindrically shaped passage 11 as a gas-injecting portion is disposed in the buckle 4 for injecting and guiding the gas provided by the inflator 10 to the nozzle 9. When the tongue 5 is mounted in the buckle 4, the front end of the nozzle 9 opposes and mates with the passage 11.

A hole 15 is provided in the tongue 5. The mesh webbing passes through the hole 15. The tongue 5 also may include a stopper (i.e. a retaining member) 16 for preventing the webbing passing through hole 15 from moving in the longitudinal direction. The stopper 16 may comprise two half pieces 17, 18, as shown in FIG. 4, for example. The first half-piece 17 includes a protrusion 17a and the second half-piece 18 includes a recessive hole 18a. The half-pieces 17 and 18 are positioned on opposite sides of the tongue 5. The protrusion 17a is tightly inserted into the recessive hole 18a, so that the halfpieces 17 and 18 are connected together to pinch the webbing 7 of the air-belt therebetween, thereby preventing the webbing 7 from moving freely within the hole 15. When the bag 8 is inflated a tensile force is generated in the shoulder belt 2. When the force exceeds a predetermined value, the half-pieces 17 and 18 separate from each other permitting the air-belt 1 to move freely through the hole 15.

A slit 20 is formed in the length of mesh webbing 7 along a side edge of the air-belt between the shoulder belt 2 and the lap belt 3 and passing through the hole 15. The slit 20 extends from the tongue 5 in the direction of the shoulder belt 2 approximately 20 to 50 mm and from the tongue 5 in the direction of the lap belt 3 approximately 50 to 100 mm. Both ends of the slit 20 are securely sewed so that the mesh webbing 7 closes the slit 20 thereby preventing the split from spreading or increasing in length.

As shown in FIG. 2, the nozzle 9 passes through the slit 20. The nozzle 9 may be formed of a bent pipe in a roughly S-shape and fixed to the tongue 5 by a bracket 19 integrally formed with the nozzle 9. The nozzle 9 may be fixed to the tongue 5 by riveting, for example, through a hole 21. The rear end of the nozzle 9 is fitted into the end of the bag 8 and the bag 8 may be hermetically and securely joined to the nozzle 9 with a clamping band 22.

The bag 8 is formed of a material impermeable or scarcely permeable by gas (e.g. resin coated cloth) in an elongated shape. The bag may be folded into a slender belt. The bag 8 is folded twice in the direction orthogonal to the longitudinal direction of the shoulder belt 2 to form an additional or overlapping portion 25 as shown in FIG. 2(b). The stress applied to a connecting portion between the bag 8 and the nozzle 9 is eased by forming the overlapping portion 25. The overlapping portion 25 is unfolded to allow the bag to straighten when the bag 8 is inflated as shown in FIG. 3(b).

The mesh webbing 7 covering the folded belt bag 8 comprises a flat and hollow belt. The mesh webbing 7 is formed of knit fabric, which has limited elasticity in the longitudinal direction but is more supple and may be stretched along its width or radial direction.

The inner surface of the length of mesh webbing 7 and the bag 8 may be bonded together with a bonding layer 23 as shown in FIG. 5. The bonding layer 23 is preferably formed of a suitable adhesive or a bonding agent. Alternatively, the length of mesh webbing 7 and the bag 8 may be joined together by fusion. The inner surface of the mesh webbing 7 and the bag 8 are joined together in such a manner, so that the inner surface of the mesh webbing 7 and the outer surface of the bag 8 cannot slip relative to each other. As a result of the bonding between the bag 8 and the shoulder belt 2, the shoulder belt 2 may be easily handled. The bonding between the inner surface of the length of mesh webbing 7 and the bag 8 is released by exfoliation, etc., when the bag 8 is inflated. The separation of the bag from the webbing 7 allows the bag to inflate without being restricted by the mesh webbing 7.

The air-belt device formed as above is used for protecting an occupant of a vehicle when the tongue 5 is secured into the buckle 4. When the inflator 10 is not actuated, the air-belt 1 restricts an occupant to the seat in the same manner as an ordinary seat belt device. When the bag 8 is not inflated, the shoulder belt 2 is flat.

When the tongue 5 is mounted in the buckle 4, and the inflator 10 is actuated (e.g. by a collision involving the vehicle). Gas is introduced into the bag 8 from the gas-injecting passage 11 through the nozzle 9. As the bag inflates, the shoulder belt 2 radially expands into a thick cylindrical shape. One end of the shoulder belt 2 rolls up within the ELR 12 thereby preventing the shoulder belt from unrolling and lengthening during the collision. Therefore, the length of the mesh webbing 7 forming the shoulder belt 2 is reduced by the radial expansion of the shoulder belt 2, and a tensile force exceeding a predetermined amount of tensile force is generated in the shoulder belt 2. The excessive force on the webbing causes the stopper 16 to be released allowing the lap belt 3 to move through the hole 15 toward the shoulder belt 2. The positioning of the nozzle 9 within the slit 20 allows the lap belt 3 to move smoothly toward the shoulder belt 2 without obstruction by the nozzle 9. The tension generated in the shoulder belt 2 is thereby transferred to the lap belt 3, so that the air-belt 1 is tightened as a whole to fit an occupant and restrict the occupant firmly to the seat.

The bag 8, the nozzle 9 and/or the buckle 4 may include vent holes (not shown) for venting the gas in the bag 8. When the upper half of the occupant body leans over the inflated shoulder belt 2, the gas may flow gradually out of the bag through the vent holes so that the impact applied to the occupant is absorbed.

As described above, according to the present invention, when the air-belt is inflated, the tension generated in the shoulder belt is transferred to the lap belt as well, so that both the shoulder belt and the lap belt adhere closely to the occupant. The priority document, Japanese Patent Application No. H11-63499, filed Mar. 10, 1999, is incorporated by reference herein.

We claim:

1. An air-belt device comprising:
    a mesh webbing enclosing a bag for receiving a pressurized gas;
    a tongue having a hole, the webbing passing through the hole so that the webbing includes a shoulder side portion on one side of the hole and a lap side portion on the other side of the hole, wherein the webbing moves freely within the hole after the bag is inflated;

a buckle for receiving the tongue;

first retractor for rolling up a first end of the webbing adjacent the shoulder side portion;

a second retractor for rolling up a second end of the webbing adjacent the lap-side portion;

a passage disposed in the buckle for carrying pressurized gas; and a nozzle for receiving gas secured to the tongue and connected to the bag, the nozzle positioned to mate with the passage when the tongue is mounted in the buckle, wherein a slit is formed in a side edge of the mesh webbing in the region of the hole in the tongue, and wherein the nozzle is disposed in the slit.

2. The air-belt device according to claim 1, wherein the nozzle comprises an s-shaped pipe.

3. The air-belt device of claim 1, wherein the bag is folded along a line substantially orthogonal to the longitudinal direction of the webbing.

4. The air-belt device of claim 1, further comprising a retaining member for retaining the webbing to the hole of the tongue, wherein the retaining member releases the webbing when a force exceeding a predetermined strength is exerted on the webbing thereby permitting the webbing to move freely within the hole.

5. The air-belt device of claim 1, wherein the slit extends away from the tongue toward both the shoulder-side portion and the lap-side portion of the webbing.

6. The air-belt device of claim 1, wherein the webbing includes an internal surface bonded to the bag, the bonding having a strength such that the bonding is released when the bag is inflated.

7. The air-belt device of claim 1, wherein the nozzle is positioned in the slit to be substantially parallel to the shoulder side portion of the webbing.

8. An air-belt device comprising:

a webbing enclosing a bag for receiving a pressurized gas;

a tongue having a hole, the webbing passing through the hole so that the webbing includes a shoulder side portion on one side of the hole and a lap side portion on the other side of the hole;

a buckle for receiving the tongue;

a passage disposed in the buckle for carrying pressurized gas; and a nozzle for receiving gas secured to the tongue and connected to the bag, the nozzle positioned to mate with the passage when the tongue is mounted in the buckle, wherein a slit is formed in a side edge of the mesh webbing in the region of the hole in the tongue and the nozzle is disposed in the slit; and a retaining member connecting the webbing to the tongue, wherein the retaining member releases the webbing when a force exceeding a predetermined strength is exerted on the webbing thereby permitting the webbing to move freely within the hole.

9. An air-belt device comprising:

a webbing enclosing a bag for receiving a pressurized gas, the webbing having a slit in a side edge;

a tongue having a hole, the webbing passing through the hole so that the webbing includes a shoulder side portion on one side of the hole and a lap side portion on the other side of the hole;

a buckle for receiving the tongue;

a passage disposed in the buckle for carrying pressurized gas; and a nozzle disposed in the slit for receiving gas, the nozzle being secured to the tongue and connected to the bag and positioned to mate with the passage when the tongue is mounted in the buckle, and a retaining member for retaining the webbing to the hole of the tongue, wherein the retaining member retains the webbing until a force exceeding a predetermined strength is exerted on the webbing thereby permitting the webbing to move freely within the hole.

* * * * *